Oct. 24, 1967     E. W. TURPIN     3,348,593
CLAMPING APPARATUS FOR OPEN CENTER TIRE RIMS
Filed Aug. 16, 1965     2 Sheets-Sheet 1

EUGENE W. TURPIN
INVENTOR

Huebner & Worrel
ATTORNEYS

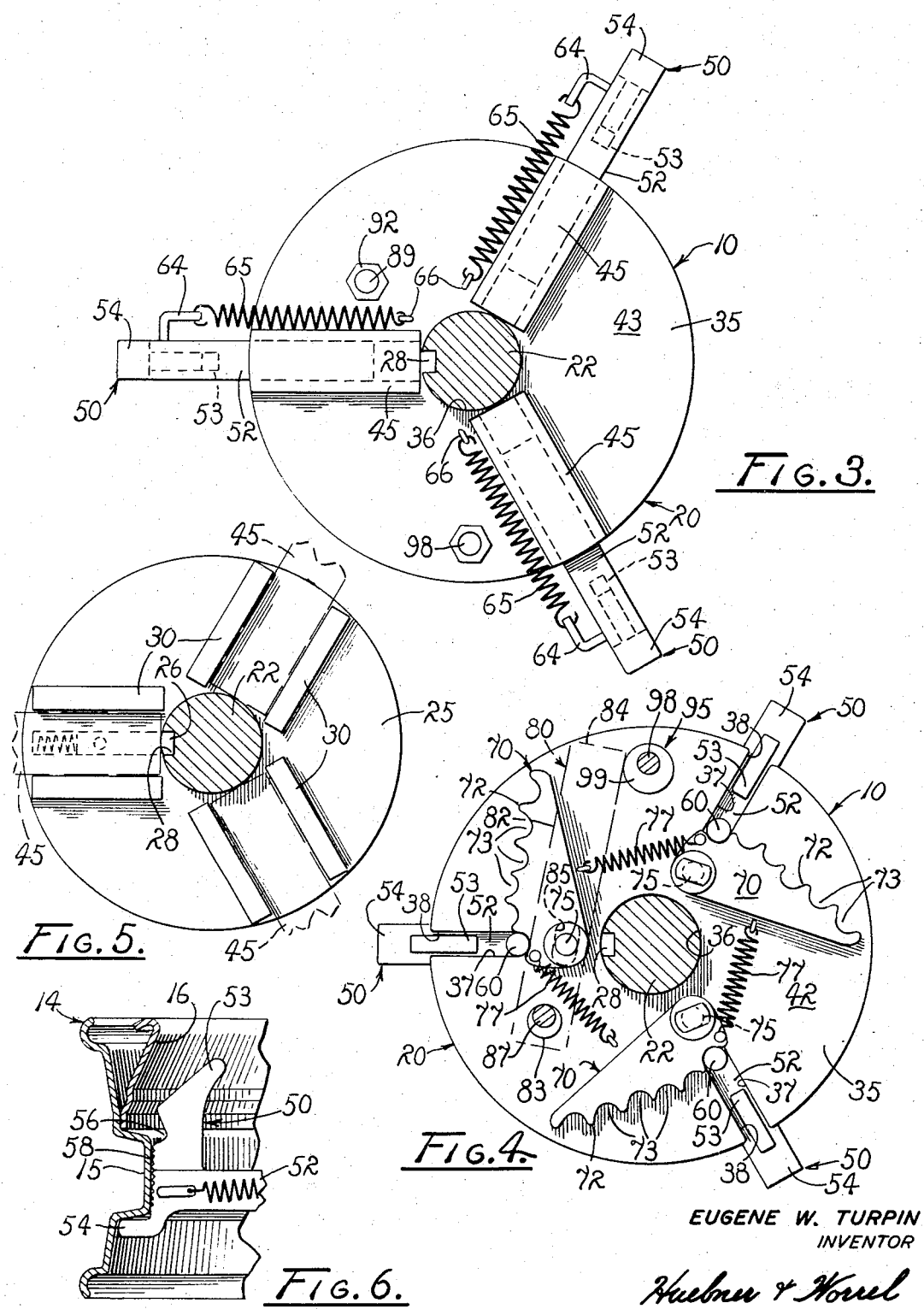

United States Patent Office
3,348,593
Patented Oct. 24, 1967

3,348,593
CLAMPING APPARATUS FOR OPEN
CENTER TIRE RIMS
Eugene W. Turpin, 66 N. Academy,
Sanger, Calif. 93657
Filed Aug. 16, 1965, Ser. No. 480,044
10 Claims. (Cl. 144—288)

ABSTRACT OF THE DISCLOSURE

A clamping apparatus having a support adapted to be loosely received within an open center tire rim and including rim engaging means, an adjusting device for preliminarily positioning the rim engaging means outwardly from the support against the rim, and lock means engageable with the adjusting device manipulatable farther to extend the adjusting means outwardly from said preliminary position to tighten and to hold the rim engaging means in clamping relation against the rim.

---

The apparatus of the present invention is specifically intended for use with wheel supporting devices of the type covered by my copending application Ser. No. 303,285, entitled "Wheel Supporting and Tire Dismounting Apparatus," filed Aug. 20, 1963, now Patent No. 3,168,130. It will be readily apparent, however, that the present invention is not limited to such use.

Open center tire rims of the type frequently employed on large vehicles such as semi-trailers, trucks, tractors and the like, are customarily mounted on spoked or disc wheels. Because of the relatively large bulk and weight of the assembled wheels, rims and tires, the rims are detachable from the spokes or discs for ease of handling during subsequent tire mounting and dismounting operations. Consequently, after removal of the tire and rim assemblies from the vehicle, the rims are without hubs which, in other types of wheels, are ordinarily utilized to mount the tire and rim assemblies on the tire mounting and dismounting devices represented by the structure of my above designated copending application. It has been noted that the forces exerted against the rims when breaking loose the tire bead therefrom in such dismounting devices may be as high as four-thousand pounds per square inch. Therefore, the open center tire rims are extremely difficult to hold and to maintain in the desired work positions.

Accordingly, it is an object of the present invention to provide an improved clamping apparatus for open center tire rims.

Another object is to provide such an improved clamping apparatus for dependably supporting open center tire rims of varying sizes and configurations.

Another object is to provide a clamping apparatus for open center tire rims which is easily insertable and removable from such rims.

Another object is to provide a clamping apparatus of the character described which is capable of dependably constraining rim and tire assemblies on tire mounting and dismounting devices with a minimum of physical labor.

Another object is to provide a clamping apparatus for rims capable of withstanding the high pressures developed against the rims during tire mounting and dismounting operations.

Another object is to provide a clamping apparatus for open center tire rims which is capable of being quickly and conveniently adapted to a wide variety of rim sizes and configurations.

Another object is to provide a clamping apparatus for open center tire rims which is capable of providing a plurality of closely spaced increments of adjustment.

Other objects and advantages of the present invention will subsequently become more clearly apparent upon reference to the following description and accompanying drawings.

In the drawings:

FIG. 3 is a bottom plan view of the clamping apparatus of the present invention removed from the tire rim.

FIG. 4 is a top plan view of the clamping apparatus removed from the tire rim and shown in a retracted position.

FIG. 5 is a fragmentary top plan view of a drive member on the wheel support device of FIG. 2 looking in the direction of the arrows on line 5—5 of FIG. 2 showing its coacting relation with the clamping apparatus of the present invention.

FIG. 6 is a fragmentary cross section of the tire rim shown in an inverted position from that of FIG. 2 to disclose an alternate gripping position of the clamping apparatus.

Figure 1:
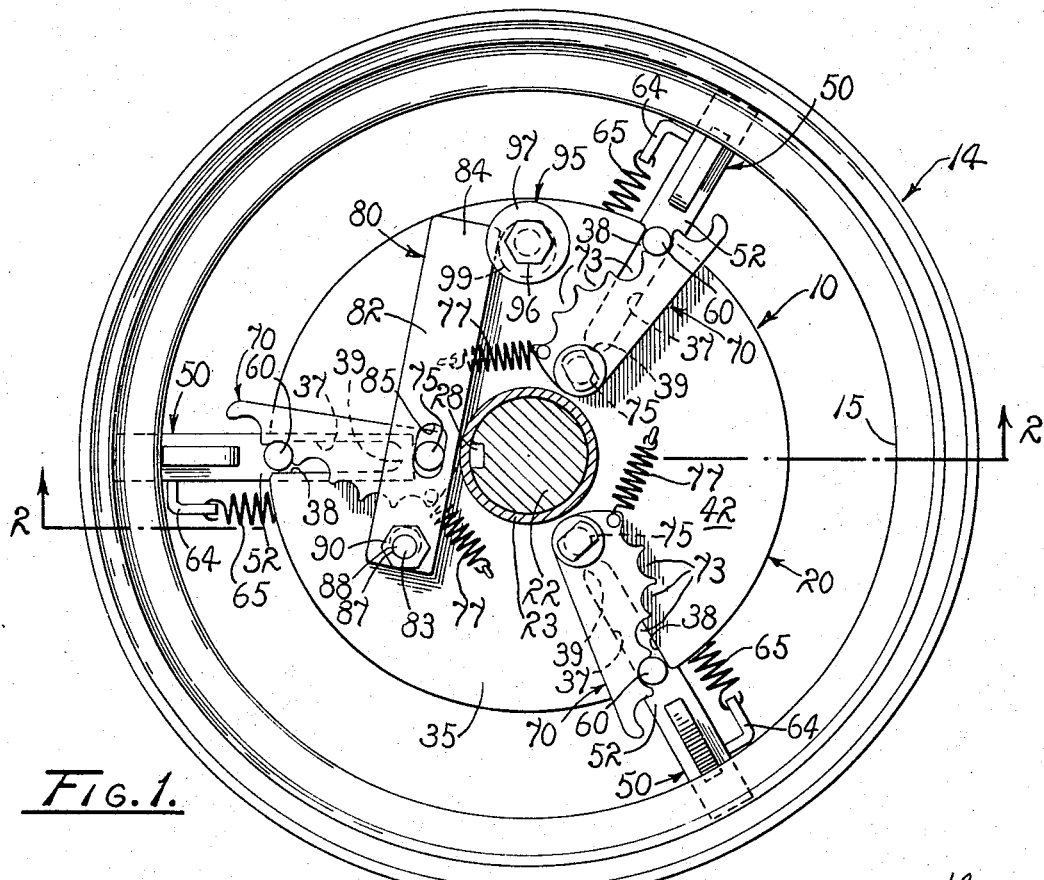
FIG. 1 is a top plan view of the clamping apparatus embodying the principles of the present invention disposed in expanded clamping relation within an open center tire rim.

Referring more particularly to the drawings, a clamping apparatus embodying the principles of the present invention is generally indicated by the reference numeral 10. The clamping apparatus is adapted for mounting open center tire rims such as that indicated by the reference numeral 14 having an annular dropped center portion 15 and an annular inner mounting flange 16. It should be noted that the particular configuration of the open center tire rim shown herein is merely representative of many varied configurations which may be employed with the clamping apparatus of the present invention.

Figure 2:
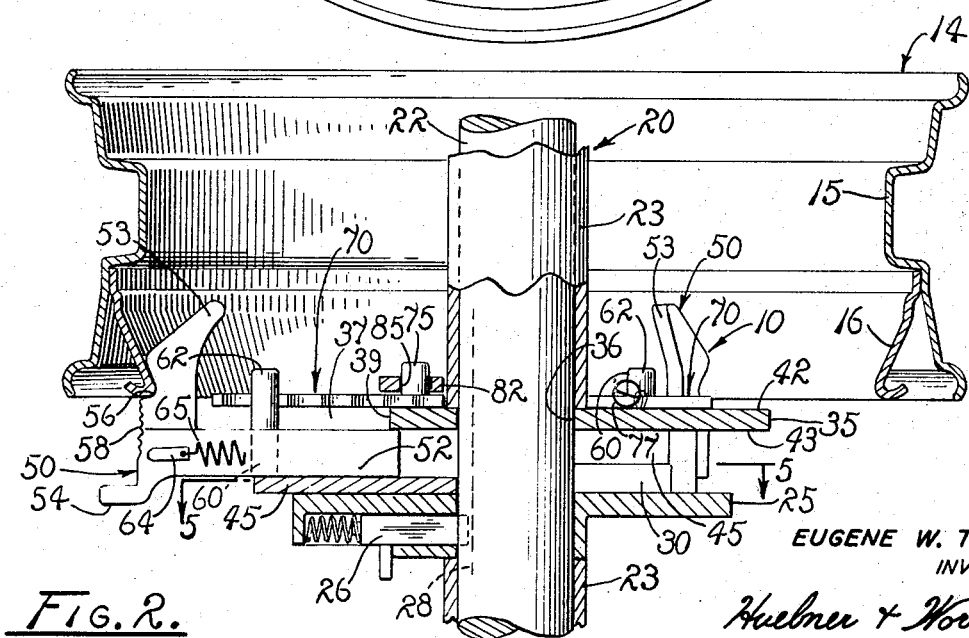
FIG. 2 is a transverse vertical section through the clamping apparatus and tire rim taken on line 2—2 of FIG. 1 showing the clamping apparatus supporting the tire rim on a fragmentarily illustrated wheel support device.

The clamping apparatus 10 is adapted to mount the open center rim 14 on a wheel assembly support device, such as that shown in my above designated copending application which is fragmentarily illustrated in FIG. 2 and is generally designated by the reference numeral 20. Briefly, the wheel support device provides a power driven, rotatable support post 22 which is adapted to be extended in a substantially upright position from a base, not shown. A plurality of wheel positioning sleeves 23 are mounted on the post with the lowermost sleeve in FIG. 2 supporting a drive plate 25. The drive plate is drivingly connected to the post by a detent mechanism 26 releasably engageable with a slot or keyway 28 in the post. As best shown in FIG. 5, the drive plate provides a plurality of sets of circumferentially spaced drive bars 30 with the bars of each set disposed in spaced substantially parallel relation.

The clamping apparatus 10 of the present invention provides a substantially circular support plate 35 of a diameter adapted to be loosely received within the rim 14. The plate has a centrally disposed bore 36 therethrough and a plurality of elongated radially extended circumferentially spaced slots 37. The slots include outer ends 38 which open outwardly of the periphery of the support plate and opposite inner ends 39 which terminate short of the bore 36. The plate further includes a normally upwardly disposed control surface 42 and an opposite lower drive surface 43. A plurality of elongated guides or channel members 45 are rigidly mounted on the lower drive surface 43 of the support plate 35 in individual coextensive covering relation to the slots 37.

A plurality of rim engaging feet 50 provide elongated leg portions 52 which are individually slidably received within the channel members 45 for radial extension and retraction from the support plate 35. Each of the feet includes a toe portion 53 upwardly extended through its associated slot 37 in the support plate when disposed in a retracted position and an opposite heel portion 54. Between the toe and heel portions, the feet include a rim receiving notch 56 adjacent to the toe portion and a substantially straight serrated gripping surface 58 adjacent to the heel portion. An elongated pin 60 is mounted on each of the leg portions 52 and is upwardly extended through its associated slot 37 to terminate in an upper end 62 spaced above the upper control surface 42 of the support plate. An L-shaped bracket 64 is rigidly mounted on each of the feet to support one of the ends of a plurality of elongated tension springs 65 which are individually connected at their opposite ends to the lower drive surface 43 of the support plate by projections 66 extended therefrom normally to urge the leg portions 52 of the feet 50 inwardly of the channel members 45 to their retracted positions.

A plurality of ratcheting camming members 70 are disposed on the upper control surface 42 of the support plate 35 in circumferentially equally spaced relation individually adjacent to the slots 37 therein. Each of the camming members provides an arcuate camming surface 72 having a plurality of semi-circular notches 73 therein for receiving the upper end 62 of an adjacent pin 60. The camming members further include pivot shafts 75 disposed for rotation about respective axes lying in a plane substantially aligned with their associated slots 37 between the inner ends 39 thereof and the central bore 36 in the support plate. Two of the pivot shafts are rotatably extended through the support plate while the third pivot shaft, as viewed to the left of the center line of the plate in FIG. 1, is extended from its respective camming plate upwardly outwardly from the support plate.

A plurality of elongated tension springs 77 are individually connected between the camming members 70 and the upper control surface of the support plate to urge the camming members in a counterclockwise direction about their respective pivotal axes, as viewed in FIG. 1, to insure positive seating of the pins 60 within the notches 73 of their respective camming members. It is readily apparent that as the camming members are swung between the positions of FIGS. 1 and 4, the notches 73 are moved substantially transversely of the slots 37 progressively to position the rim engaging feet 50 radially inwardly and outwardly from the support plate in the closely spaced increments of adjustment provided by selective engagement of the pins 60 with the notches 73.

A lock mechanism, generally indicated by the reference numeral 80, is disposed upon the upper control surface 42 of the support plate 35 in overlying relation to the camming member 70 having the outwardly extended pivot shaft 75. The lock mechanism provides an elongated locking bar 82 having a pivot end 83 and an opposite distal end 84. An elongated slot 85 is formed in the bar intermediate its ends to receive therethrough the outwardly extended pivot shaft 75 of its associated camming member 70. The pivot end of the locking bar is mounted for rotation about an eccentric pivot mounting bolt 87 which provides opposite threaded ends 88 and 89 for receiving lock nuts 90 and 92, respectively, rigidly to constrain the mounting bolt in a predetermined adjusted position with respect to the support plate 35.

A control device 95, for effecting positive clamping of the clamping apparatus within the rim 14, is disposed on the support plate 35 in closely spaced adjacent relation to the distal end 84 of the locking bar 82. The control device provides a hexagonally shaped adjusting head 96 and an annular flange 97 spaced from the upper control surface 42 of the support plate in overlying relation to the distal end 84 of the locking bar 82 for rotating a lower shaft 97 journaled in the support plate. The shaft provides an eccentric throw or cam portion 98 engageable with the distal end of the locking bar to pivot the same about its pivot end 83.

Operation

The operation of the described embodiment of the subject invention is believed to be clearly apparent and is briefly summarized at this point. Assuming that the rim engaging feet 50 are disposed in their retracted positions of FIG. 4, the pins 60 are nested within the innermost notches 73 of the camming members 70. Such position is normally maintained by the tension springs 65 and 77, respectively, tending to swing the camming members in a counterclockwise direction and urging the rim engaging feet radially inwardly of the support plate 35.

With the rim engaging feet in their retracted positions, the clamping apparatus 10 may be easily inserted within the rim 14 in a position aligning the desired rim gripping portions of the feet with the portion of the rim to be gripped thereby. As best shown in FIG. 5, the notches 56 of the feet are aligned with the inner mounting flange 16 of the rim. As illustrated in FIG. 6, the serrated gripping surface 58 of each foot is aligned with the drop center 15 of the rim which, it will be noted, is inverted from the position shown in FIG. 2. In either position, the rim engaging feet 50 are individually radially outwardly extendable to the preliminarily adjusted position shown in FIG. 1 with the pins 60 engaging the next-to-last notches 73 of their respective camming members 70. Such positioning places the appropriate notches 56 or gripping surfaces 58 of the feet against their corresponding portions of the rim.

The control device 95 is then manipulated by rotation of the adjusting head 96 by any suitable tool, not shown, to rotate the cam shaft 98 and the cam portion 99 against the distal end 84 of the locking bar 82. This causes the distal end of the lock bar to be swung in a counterclockwise direction, as viewed in FIG. 1, about its opposite pivot end 83. Such movement of the locking bar is transmitted through the pivot shaft 75 extended within the slot 85 to cause its associated camming member 70 to be motivated radially outwardly along its associated slot 37 in the support plate 35. By its connection with the camming member through the pin 60, the associated rim engaging foot 50 is moved farther radially outwardly of its channel member 45 to increase the effective circle of the rim engaging feet so as to force them into tightly clamping relation against the rim 14. In order to compensate for wear, the eccentric pivot bolt 87 can be manipulated initially to position the pivot end 83 of the locking bar 82 farther radially outwardly on the support plate 35. This is accomplished by loosening the lock nuts 90 and 92 and retightening them after rotation of the pivot bolt to the desired position.

The assembled clamping apparatus 10 and the rim 14 are then placed on the wheel support device 20 by sliding the central bore 36 of the plate over the support post 22. As best shown in FIG. 5, the channel members 45 are individually nested between the pairs of drive bars 30 on the drive plate 25. Additional sleeves 23 are then disposed on the support post above the clamping apparatus 10 and a suitable locking member, not shown, connected to the upper end of the post to secure the sleeves, drive plate, clamping apparatus and rim in tightly stacked relation on the post and for rotation therewith during the tire mounting and dismounting operations.

After completing the tire mounting and dismounting operations, the rim 14 and the clamping apparatus 10 are removed from the wheel support device for disassembly. This is easily accomplished by reverse rotation of the cam portion 98 to permit the lock bar 82 to be swung in a clockwise direction to enable the force of the springs 65 to retract the rim engaging foot 50 associated with the lock mechanism 80. Each of the camming members may then be swung in a clockwise direction for further retraction of the rim engaging feet by positioning any of the more inwardly spaced notches 73 to receive the pins 60. It is noted that in the full range of pivotal movement of the camming members 70, the notches 73 are substantially transversely movable relative to the slots 37 in the support plate so as to provide closely spaced increments of adjustment for the rim engaging feet radially outwardly from the support plate.

In view of the foregoing, it is readily apparent that the structure of the present invention provides an improved clamping apparatus for dependably supporting open center tire rims of a wide variety of sizes and configurations during tire mounting and dismounting operations. The apparatus of the present invention provides improved gripping of the rims so as to withstand the relatively high forces imposed against the rim during such tire mounting and dismounting operations and requires a minimum of adjusting procedures when being adapted to the varied size rims.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A clamping apparatus for supporting open center tire rims during tire mounting and dismounting operations comprising a support member adapted to be loosely received within such a rim, rim engaging means mounted on the support member for controlled extension and retraction relative thereto, adjusting means borne by the support member engageable with said rim engaging means for preliminarily positioning the rim engaging means outwardly from the support member against the rim, and lock means borne by the support member manipulatable farther to extend said adjusting means outwardly from said preliminary position to tighten and to hold said rim engaging means in clamping relation against the rim.

2. A clamping apparatus adapted to support open center tire rims during tire mounting and dismounting operations comprising a support member of a size to be loosely received within such a rim, rim engaging means mounted on the support member for extension to engagement therewith and retraction therefrom, adjusting means borne by the support member engageable with said rim engaging means for preliminarily positioning the rim engaging means outwardly from the support member against the rim, and lock means borne by the support member engageable with said adjusting means and manipulatable farther to extend said adjusting means outwardly from said preliminary position to tighten and to hold said rim engaging means in clamping relation against the rim.

3. A clamping apparatus for supporting open center tire rims during tire mounting and dismounting operations comprising a support member adapted to be loosely received within such a rim, rim engaging means mounted on the support member for reciprocal adjustment between predetermined clamping and retracted positions, camming means borne by the support member providing a plurality of increments of adjustment for preliminarily positioning said rim engaging means outwardly of the support member and against the rim, and a lock member borne by the support member engageable with said camming means manipulatable farther to extend said camming means outwardly from said preliminary position to tighten and to hold said rim engaging members in clamping relation against the rim.

4. A clamping apparatus adapted to support open center tire rims during tire mounting and dismounting operations comprising a support member of a size to be loosely received within such a rim, a plurality of rim engaging members mounted on the support member in substantially equally spaced relation thereabout and for reciprocal movement inwardly and outwardly thereof, a plurality of adjustable camming members borne by the support member and individually associated with said rim engaging members in supporting relation therewith providing a plurality of increments of adjustment for preliminarily positioning said rim engaging members outwardly of the support member and against the rim, and a lock member borne by said support member engageable with one of said camming members and manipulatable farther to extend said one of said camming members outwardly from said preliminary position to tighten and to hold said rim engaging members in clamping relation against the rim.

5. A clamping apparatus for supporting open center tire rims during tire mounting and dismounting operations comprising a support member adapted to be loosely received within such a rim and having a plurality of elongated slots, a plurality of rim engaging members having elongated pins individually extended through said slots, means borne by the support member mounting said rim engaging members on the support member for extension and retraction relative thereto, a plurality of adjustable camming members borne by the support member and individually engageable with said pins of said rim engaging members in supporting relation therewith providing a plurality of increments of adjustment for preliminarily positioning said rim engaging members outwardly of the support member and against the rim, and a lock member borne by said support member engageable with one of said camming members and manipulatable farther to extend said one of said camming members outwardly from said preliminary position to tighten and to hold said rim engaging members in clamping relation against the rim.

6. A clamping apparatus for supporting open center tire rims during tire mounting and dismounting operations comprising a substantially circular support plate adapted to be loosely received within such a rim and having a plurality of elongated radially extended circumferentially spaced slots, said plate including a plurality of elongated channel members secured to the plate in individual covering relation to the slots; a plurality of elongated rim engaging members individually slidably mounted in the channel members having elongated pins individually extended through said slots in the support plate; a plurality of adjustable camming members pivotally disposed on the support plate radially inwardly adjacent to said slots engageable with said pins and providing a plurality of increments of adjustment for preliminarily positioning said rim engaging members outwardly of the support plate and against the rim, one of said camming members providing an integral pivot shaft extended outwardly from the support plate; and a lock member borne by the support plate engageable with said pin of the camming member and manipulatable farther to extend said camming member outwardly from said preliminary position to tighten and to hold said rim engaging members in clamping relation against the rim.

7. A clamping apparatus adapted to support open center tire rims during tire mounting and dismounting operations comprising a substantially circular support plate loosely receivable within such a rim and having a plurality of elongated radially extended circumferentially spaced slots, said plate including a plurality of elongated channel members secured to the plate in individual covering relation to the slots; a plurality of elongated rim engaging feet having leg portions individually slidably mounted in the channel members with each leg portion including an elongated pin extended through its respective slot in the support plate; a plurality of adjustable cams individually pivotally disposed on the support plate radially inwardly adjacent to said slots and having arcuate notched camming surfaces movable substantially transversely of the slots providing spaced increments of adjustment selectively to receive said pins of the leg portions of the rim engaging feet for preliminarily positioning said feet outwardly from the support plate against the rim, one of said cams providing an integral pivot shaft extended outwardly from the plate; and a lock member borne by the support plate engageable with said pin of the camming member manipulatable farther to extend said camming member outwardly from said preliminary position to tighten and to hold said rim engaging members in clamping relation against the rim.

8. A clamping apparatus for supporting open center tire rims during tire mounting and dismounting operations comprising a substantially circular support plate adapted to be loosely received within such a rim and having a plurality of elongated radially extended circumferentially spaced slots, said plate including a plurality of elongated channel members secured to the plate in individual covering relation to the slots; a plurality of elongated rim engaging feet having leg portions individually slidably mounted in the channel members with each leg portion including an elongated pin extended through its respective slot in the support plate; a plurality of adjustable cams individually pivotally disposed on the support plate radially inwardly adjacent to said slots and each having an arcuate camming surface movable substantially transversely of the slots, said camming surface including a plurality of notches providing spaced increments of adjustment selectively to receive said pins of the leg portions of the rim engaging feet for preliminarily positioning said feet outwardly from the support plate against the rim, one of said cams providing an integral pivot shaft extended outwardly from the support plate; and a lock member borne by the support plate engageable with said pin of the camming member and being manipulatable farther to extend said camming member outwardly from said preliminary position to tighten and to hold said rim engaging members in clamping relation against the rim.

9. A clamping apparatus for supporting open center tire rims during tire mounting and dismounting operations comprising a substantially circular support plate adapted to be loosely received within such a rim and having a plurality of elongated radially extended circumferentially spaced slots, said plate including a plurality of elongated channel members secured to the plate in individual covering relation to the slots; a plurality of elongated rim engaging feet having leg portions individually slidably mounted in the channel members with each leg portion including an elongated pin extended through its respective slot in the support plate; a plurality of adjustable cams pivotally disposed on the support plate radially inwardly adjacent to said slots and each having an arcuate camming surface movable substantially transversely of the slots, said camming surfaces each including a plurality of notches providing spaced increments of adjustment selectively to receive said pins of the leg portions of the rim engaging feet for preliminarily positioning said feet outwardly from the support plate against the rim, one of said cams providing an integral pivot shaft extended outwardly from the support plate; an elongated locking bar having an end pivotally mounted on the support plate, an opposite distal end, and an elongated slot intermediate its ends slidably and pivotally to receive said pivot shaft therethrough; and an eccentric adjusting shaft rotatably mounted on the plate manipulatable for engagement with said distal end of the locking bar for moving the cam further outwardly of the plate to tighten and to hold said rim engaging member in clamping relation against the rim.

10. A clamping apparatus for supporting open center tire rims during tire mounting and dismounting operations comprising a substantially circular support plate adapted to be loosely received within such a rim and having a plurality of elongated radially extended circumferentially spaced slots, said plate including a plurality of elongated channel members secured to the plate in individual covering relation to the slots; a plurality of elongated rim engaging feet having leg portions individually slidably mounted in the channel members with each leg portion including an elongated pin extended through its respective slot in the support plate; resilient means borne by the support plate urging said feet inwardly of their respective channels; a plurality of adjustable cams pivotally disposed on the support plate radially inwardly adjacent to said slots and each having an arcuate camming surface movable substantially transversely of the slots, said camming surfaces including a plurality of notches providing spaced increments of adjustment selectively to receive said pins of the leg portions of the rim engaging feet for preliminarily positioning said feet outwardly from the support plate against the rim, one of said cams providing an integral pivot shaft extended outwardly from the support plate; spring means borne by the support plate and connected to said cams to urge said notches of the cams into engagement with their respective pins of the rim engaging feet; an elongated locking bar having a pivot end, an opposite distal end, and an elongated slot intermediate its ends slidably and pivotally to receive said pivot shaft therethrough; an eccentric bolt releasably adjustably disposed in said support plate pivotally mounting said pivot end of the locking bar on the support plate; and an adjusting shaft having an eccentric throw portion rotatably mounted on the plate with the throw portion manipulatable for engagement with said distal end of the locking bar for moving the cam associated with said pivot shaft farther outwardly of the plate to tighten and to hold said rim engaging member in clamping relation against the rim.

References Cited
UNITED STATES PATENTS

| | | |
|---|---|---|
| 1,008,652 | 11/1911 | Kremer. |
| 1,462,455 | 7/1923 | Larson _____ 157—1.39 |
| 2,197,808 | 4/1940 | Mason. |
| 2,764,194 | 9/1956 | Schultz. |
| 2,948,314 | 8/1960 | Bishman. |

WILLIAM W. DYER, Jr., *Primary Examiner.*

R. J. ZLOTNIK, *Assistant Examiner.*